United States Patent [19]

Luebbering

[11] Patent Number: 5,000,042

[45] Date of Patent: Mar. 19, 1991

[54] ENGINE TIMING CALIBRATION METHOD

[75] Inventor: Bernard L. Luebbering, Morton, Ill.

[73] Assignee: Caterpillar Inc., Peoria, Ill.

[21] Appl. No.: 421,811

[22] Filed: Oct. 16, 1989

[51] Int. Cl.⁵ .......... G01M 15/00

[52] U.S. Cl. .......... 73/119 A

[58] Field of Search .......... 73/5, 117.2, 117.3, 73/119 R, 119 A

[56] References Cited

U.S. PATENT DOCUMENTS 3,412,602 11/1968 Rush et al. .......... 73/119 A
4,141,242 2/1979 Scott .
4,790,277 12/1988 Schechter .......... 73/119 A

FOREIGN PATENT DOCUMENTS 0060855 5/1981 Japan .......... 73/119 A

*Primary Examiner*—Robert Raevis
*Attorney, Agent, or Firm*—Marshall, O'Toole, Gerstein, Murray & Bicknell; William E. McCracken

[57] ABSTRACT

A method of calibrating the timing of a fuel injected engine using the outputs of first and second position detectors both of which develop signals representing the position of a piston in a cylinder includes the steps of operating the engine using a first reference timing value to determine the time at which a fuel injector is actuated, determining from the output of the second position detector a measured time value representing the length of time between actuation of the fuel injector and the time at which the piston reaches a certain position in the cylinder and subtracting from the measured time value an offset value representing the length of time between actuation of the fuel injector and the actual beginning of fuel injection to obtain an actual timing value. A second reference timing value is calculated from the first reference timing value, the actual timing value and a desired timing value and is subsequently used to determine the time at which the fuel injector is thereafter actuated.

9 Claims, 5 Drawing Sheets

ENGINE TIMING CALIBRATION METHOD

TECHNICAL FIELD

The present invention relates generally to engine control methods, and more particularly to a method of calibrating the timing of an electrically controlled fuel injected engine.

BACKGROUND ART

The timing of an internal combustion engine must be accurately controlled so that emissions are minimized and so that the engine runs at peak efficiency. In compression type or diesel engines, ignition occurs upon injection of fuel into a cylinder containing air which has been compressed by a piston which is movable in the cylinder. The "timing" of such an engine is defined as the time at which a fuel injector is operated to inject fuel into the cylinder relative to the time at which the piston reaches a position known as "top dead center" in the cylinder which is reached at the end of the piston stroke. In past diesel engines, the fuel injectors have been of the mechanical type which are controlled by a cam shaft which is geared to the crankshaft of the engine. In recent years, however, electronic or solenoid controlled fuel injectors have been adopted for use and which are operated by an engine control and a solenoid driver circuit. Such an arrangement is disclosed in Pflederer, U.S. Pat. No. 4,604,675, entitled "Fuel Injection Solenoid Driver Circuit" and assigned to the assignee of the instant application. A somewhat modified solenoid driver circuit is disclosed in Grembowicz, et al., U.S. patent application Ser. No. 07/260,241, filed Oct. 20, 1988, entitled "Driver Circuit For Solenoid Operated Fuel Injectors" (Caterpillar Case No. 88-264) and assigned to the assignee of the instant application. Both of these applications are expressly incorporated by reference herein.

In diesel engines which utilize electronic fuel injectors, some provision must be made for sensing the position of the pistons within the cylinders relative to top dead center (TDC). Luebbering, U.S. patent application Ser. No. 07/078,728, filed July 28, 1987, entitled "Apparatus For Determining the Speed, Angular Position and Direction of Rotation of a Rotatable Shaft" and assigned to the assignee of the instant application (Caterpillar Case No. 86-136), the disclosure of which is also hereby incorporated by reference, discloses the use of a magnetic pickup disposed adjacent a toothed gear or wheel coupled to a crankshaft or cam shaft of an engine. The magnetic pickup develops a series of pulses which are representative of the positions of the pistons in the cylinders. This information is used to accurately control the actuation of the fuel injectors.

It has been found that manufacturing and assembly tolerances can cause the piston position indicated by the magnetic pickup to be shifted or offset relative to the actual position of the piston in the cylinder. This shift, if uncorrected, causes a loss of timing accuracy, resulting in poor engine performance and increased emissions.

SUMMARY OF THE INVENTION

In accordance with the present invention, the timing of a fuel injected engine is precisely calibrated so that engine efficiency and engine emissions are optimized.

More specifically, a method of calibrating the timing of a fuel injected engine uses the outputs of first and second position detectors which develop first and second position signals both representing the position of a piston in a cylinder and a first reference timing value representing the time between a particular point of the first signal and an estimated time at which the piston reaches TDC. The method includes the steps of operating the engine using the first reference timing value to determine the time at which a fuel injector which delivers fuel to the cylinder is actuated, determining from the output of the second position detector a measured time value representing the length of time between actuation of the fuel injector and the time at which the piston reaches a certain position in the cylinder and subtracting from the measured time value an offset value representing the length of time between actuation of the fuel injector and the actual beginning of fuel injection to obtain an actual timing value. A second reference timing value equal to the first reference timing value plus the actual timing value less a desired timing value is calculated and represents the length of time between the particular point of the first signal and the time at which the piston reaches TDC. The second reference timing value is used together with the first signal to thereafter determine the times at which the fuel injector is actuated.

The method of the present invention can be implemented by a service tool which requires only one additional sensor for detecting the position of the piston in the cylinder. In the preferred embodiment, such sensor comprises a magnetic pickup or other proximity sensor which detects a particular portion of the engine crankshaft. Inasmuch as the crankshaft position is directly related to the position of the piston in the cylinder, the magnetic pickup develops a signal which provides a highly accurate indication of when the piston reaches top dead center in the cylinder. This affords the capability of precise calibration not only during initial assembly of the engine, but also after the engine has been placed in use.

DESCRIPTION OF THE PREFERRED EMBODIMENT

Figure 1:
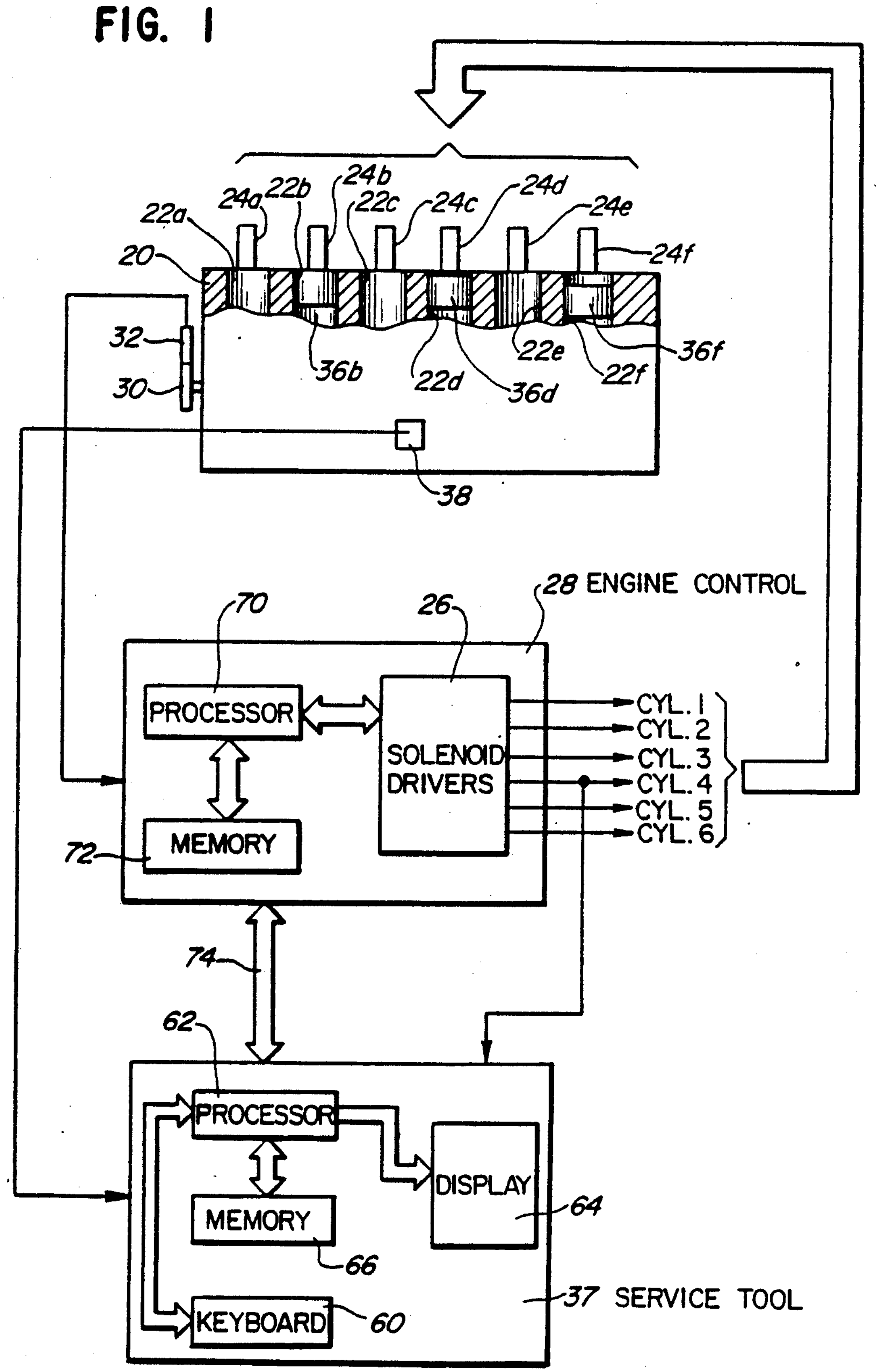
FIG. 1 is a diagrammatic illustration of a fuel injected engine together with a block diagram of circuitry for implementing the method of the present invention.
Figure 2:
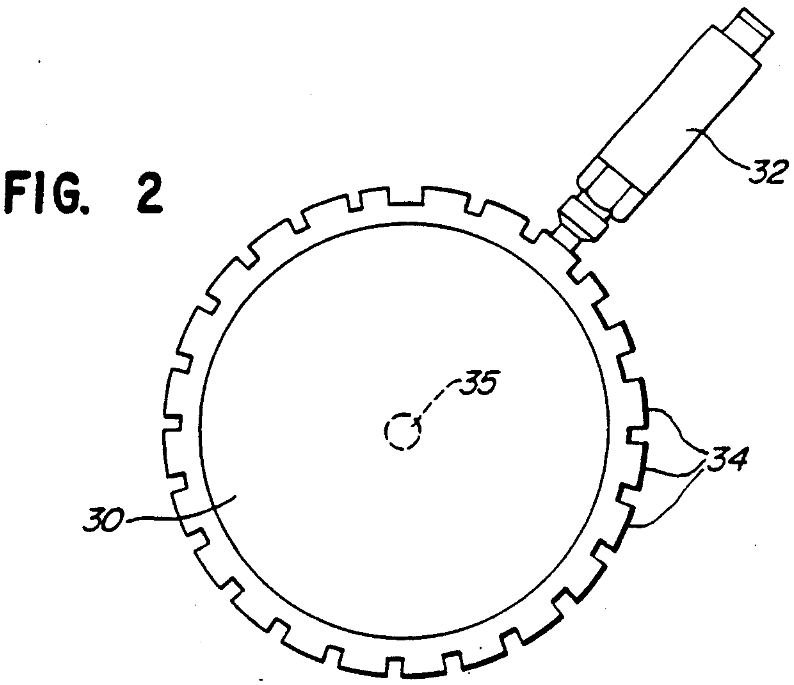
FIG. 2 is an elevational view of the timing gear and magnetic pickup illustrated in diagrammatic form in FIG. 1.

Referring now to FIG. 1, an internal combustion engine 20 of the fuel injected type includes N cylinders 22 which are provided fuel by N electronic solenoid operated fuel injectors 24. In the illustrated embodiment, N=6, and hence there are six cylinders 221-**22*f* and six fuel injectors 24*a*-24*f* associated therewith, respectively. The fuel injectors 24a–24f include solenoid coils (not shown) that are energized by a solenoid driver circuit 26 which is a part of an engine control 28. The engine control 28 is responsive to the output of a first position detector comprising, as seen in FIG. 2, a toothed timing wheel or gear 30 and a magnetic pickup (MPU) in the form of a Hall effect device. The toothed gear or wheel 30 includes a series of circumferentially spaced teeth 34. In addition, the wheel 30 is mounted on a shaft 35 which is in turn coupled to a crankshaft or cam shaft of the engine 20. The wheel 30 thus rotates as the engine 20 is running, causing the teeth 34 to pass beneath the MPU 32. In response to the passage of the teeth 34, the MPU 32 develops a series of pulses illustrated in the top waveform diagram of FIG. 5. The signal developed by the MPU 32 represents the positions of pistons 36 (only three of which 36b, 36d and 36f are shown in FIG. 1) in the cylinders 22**.

Figure 3:
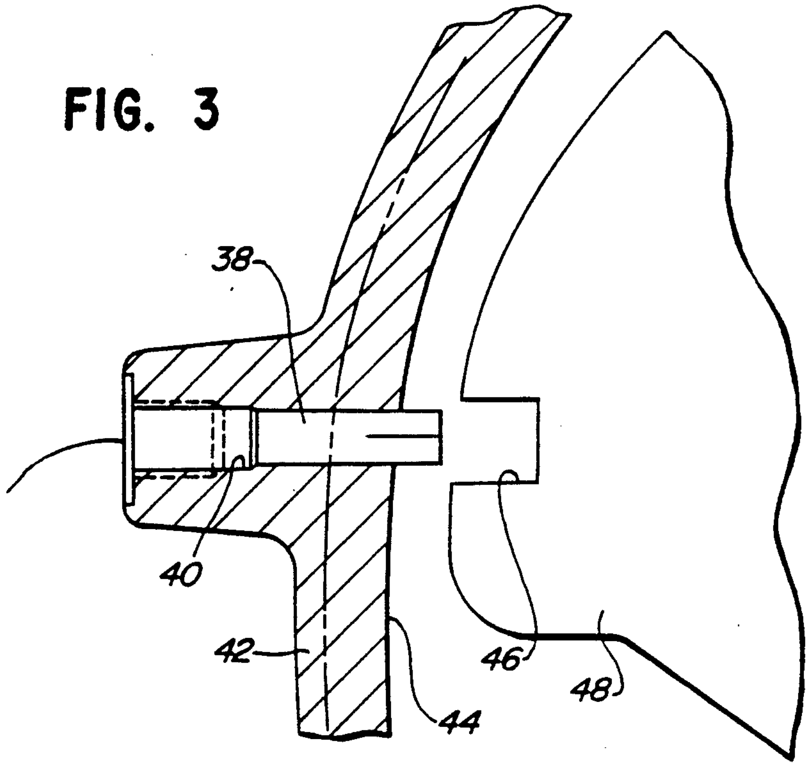
FIG. 3 is an elevational view, partly in section, illustrating the position of the proximity sensor shown in FIG. 1 relative to a crankshaft of the engine.
Figure 4:
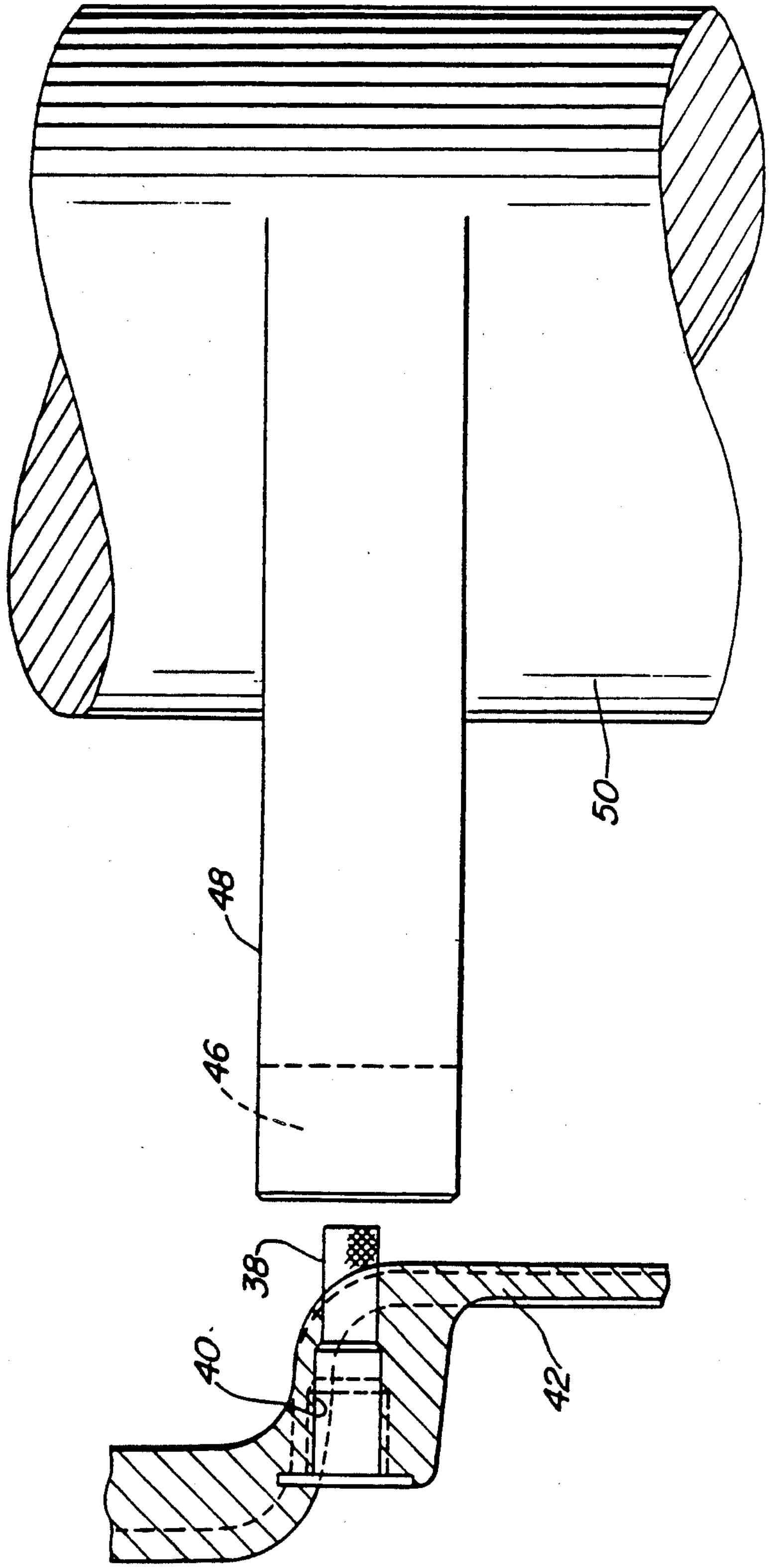
FIG. 4 is a plan view, partly in section, illustrating the proximity sensor and crankshaft shown in FIG. 3.

Referring again to FIG. 1, a service tool 37 is responsive to a second position detector 38 which develops a second position signal representing the positions of the pistons 36 in the cylinders 22. As seen in greater detail in FIGS. 3 and 4, the position sensor 38 preferably comprises a further MPU which is mounted in an opening 40 in the side of an engine block wall 42. The MPU 38 protrudes inwardly into the crankcase 44 of the engine 20 and is adapted to sense a cutout or notch 46 formed in a counterweight 48 of a crankshaft 50 of the engine 20. The MPU 38 develops a signal shown in the bottom waveform diagram of FIG. 5 which remains at a steady level until the cutout or notch 46 passes the end of the MPU 38. At this point, a pair of positive-going and negative-going peaks are developed by the MPU 38. At a point midway between these peaks, one of the pistons, for example the piston 36d, reaches top dead center (TDC) within the cylinder 22d. Inasmuch as the crankshaft 48 is a part which is fabricated with high precision and provided that the notch 46 is positioned accurately, the point at which the piston 36d reaches TDC can be accurately determined from the output of the MPU 38. This determination, in turn, is utilized by the method of the present invention to accurately calibrate the timing of the engine 20.

Figure 6:
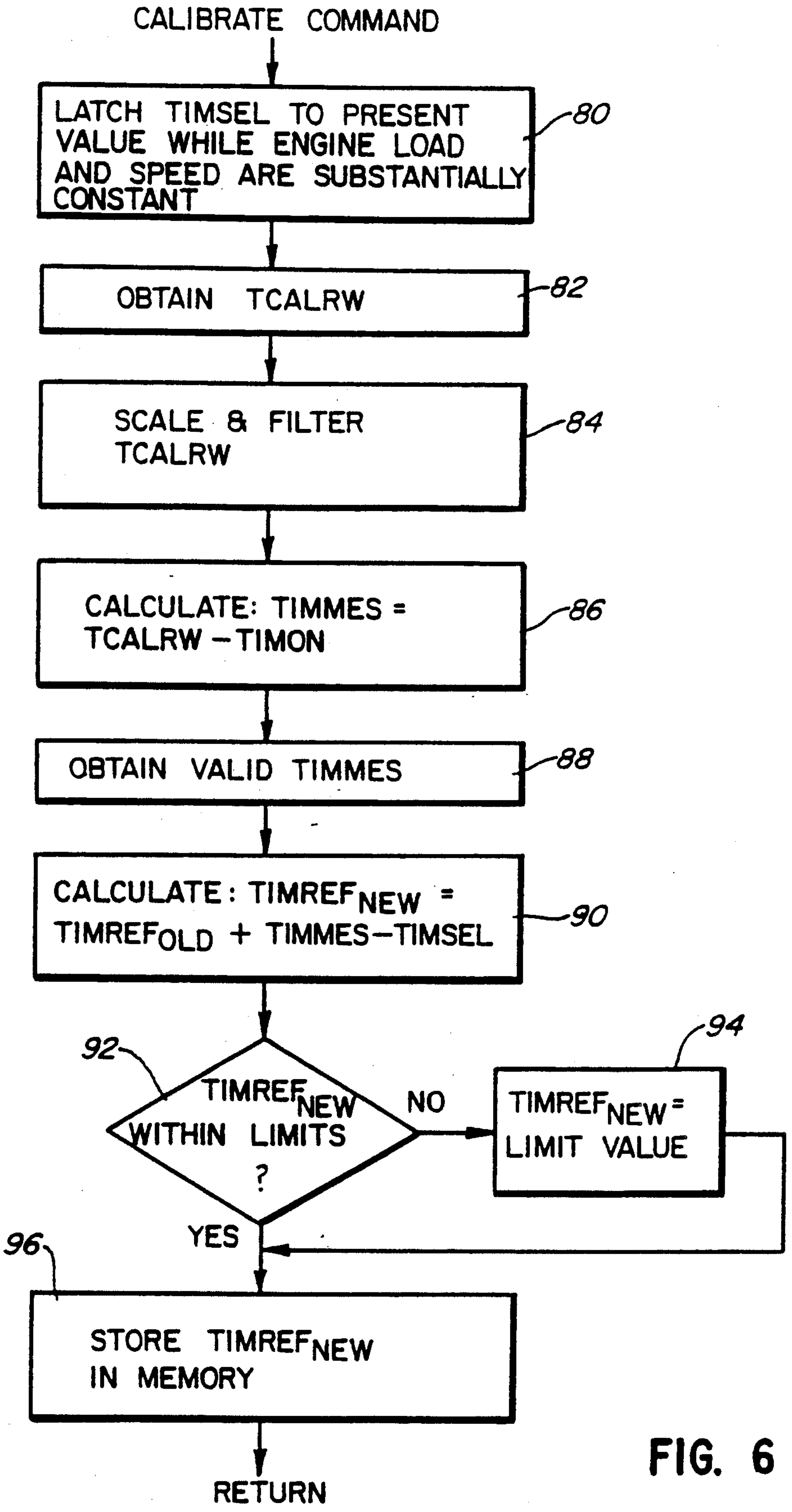
FIG. 6 is a flow chart illustrating a portion of the programming executed by the service tool and the engine control illustrated in FIG. 1 to implement the method of the present invention.

The service tool 37, FIG. 1, includes means for interacting with a service technician or other operator. Such means includes a keyboard 60 which is coupled to a processor 62 and a video display terminal (VDT) 64 which provides information concerning the status of various operating parameters of the engine 20. The service tool 37 also includes a memory 66 of any suitable type which stores various parameters including timing parameters utilized by the method of the present invention. The memory 66 further stores programming executed by the processor 62 to implement a portion of the present method as illustrated in FIG. 6.

The engine control 28 also includes a processor 70 and a memory 72 which are operative to control the engine 20 and which implement the reading portion of the present method. A communication channel in the form of a serial link 74 interconnects the control 28 and the service tool 37.

Referring again to FIG. 5, the memory 72 stores a value $TIMREF_{OLD}$ which is a first reference timing value representing the time between a particular point of the signal developed by the timing wheel 30 and an estimated time at which the piston 36a reaches TDC. In the preferred embodiment, the time period represented by the value $TIMREF_{OLD}$ commences upon a rising edge of a particular pulse of the signal developed by the MPU 32 at a time $T_0$ and ends at a time $T_1$. Also stored in the memory 72 is a series of values TIMON each of which represents the length of time between actuation of a fuel injector and the actual beginning of fuel delivery by the injector for a particular engine speed. In the preferred embodiment, each injector solenoid receives a controlled current, for example at a time $T_2$, which causes the injector to begin delivering fuel at a time $T_3$ into an associated cylinder, for example the cylinder 22d. The value TIMON is not only a function of engine speed, but also a function of the particular fuel injector which is used with the engine 20.

Also stored in the memory 72 is a series of empirically determined values TIMSEL, each of which represents a desired timing value for a particular time and for particular levels of engine load, engine speed, and coolant temperature. The value TIMSEL represents the time period between $T_3$ and $T_1$.

The method of the present invention determines a measured time value TCALRW, representing the time period between the time $T_2$ and a time $T_4$ at the point midway between the peaks of alternating polarity in the signal developed by the second position sensor 38. An actual timing values TIMMES is determined from the value TCALRW and represents the period of time between the times $T_3$ and $T_4$. A second reference timing value $TIMREF_{NEW}$ is calculated from the first reference timing value $TIMREF_{OLD}$, the actual timing value TIMMES and the desired timing value TIMSEL. The processor 70 replaces the value $TIMREF_{OLD}$ with the second reference timing value in the memory 72 and such value is subsequently used to determine the time at which each fuel injector is thereafter actuated.

Referring now to FIG. 6, there is illustrated programming executed by the service tool 37 and the engine control 28 to implement the method of the present invention. The method is performed during operation of the engine using the first reference timing value stored in the memory 72 which determines the times at which the fuel injectors 24 are actuated. While operating using this reference timing value, the time $T_2$ at which a controlled current is provided to one of the fuel injectors 24d is determined from the value TIMREF. In the example shown in FIG. 5, use of the value TIMREF to determine the time of fuel injection actually results in ignition in the cylinder 22d when the piston 36d is at a point beyond top dead center.

Referring specifically to the flow chart of FIG. 6, as the engine is operating using the first reference timing value stored in the memory 72, and upon issuance of a command by an operator via the keyboard 60 of the service tool 37 to calibrate the engine 20, the engine control 28 executes a block 80 to latch and hold the present value of TIMSEL for as long as engine load and speed remain constant. If either of the load or speed subsequently changes, the latching of TIMSEL is terminated and calibration is aborted. Following the block 80, the service tool executes a block 82 to measure the value TCALRW using the output of the second position detector 38. More specifically, this value is obtained by measuring the period between the time $T_2$ at which time the solenoid of the fuel injector 24d is provided the controlled current up to a point midway between the positive-going and negative-going peaks in the signal from the second position detector 38. The value TCALRW is sent to the engine control 28 over the serial link 74 and a block 84 executed by the engine control 28 scales and filters the value TCALRW. A block 86 then calculates the value TIMMES by subtracting the value TIMON from the scaled and filtered value TCALRW.

Following the block 86, a block 88 obtains a stable and valid value of TIMMES and a block 90 calculates the second or new reference timing value $TIMREF_{NEW}$. This value is equal to the first or old reference timing $TIMREF_{OLD}$ plus the actual timing value TIMMES less the desired timing value TIMSEL. A block 92 checks to determine if the value $TIMREF_{NEW}$ is within certain limits, such as ±20° either side of $TIMREF_{OLD}$. If not, a block 94 sets the value $TIMREF_{NEW}$ equal to the closer of the two limits. A block 96 then stores the value $TIMREF_{NEW}$ determined by the blocks 92 or 94 in memory to replace the value $TIMREF_{OLD}$ and control passes to remaining programming executed by the processor 70 to control the engine 20.

It should be noted that all of the blocks 86–96 are executed by the engine control 28.

Figure 5:
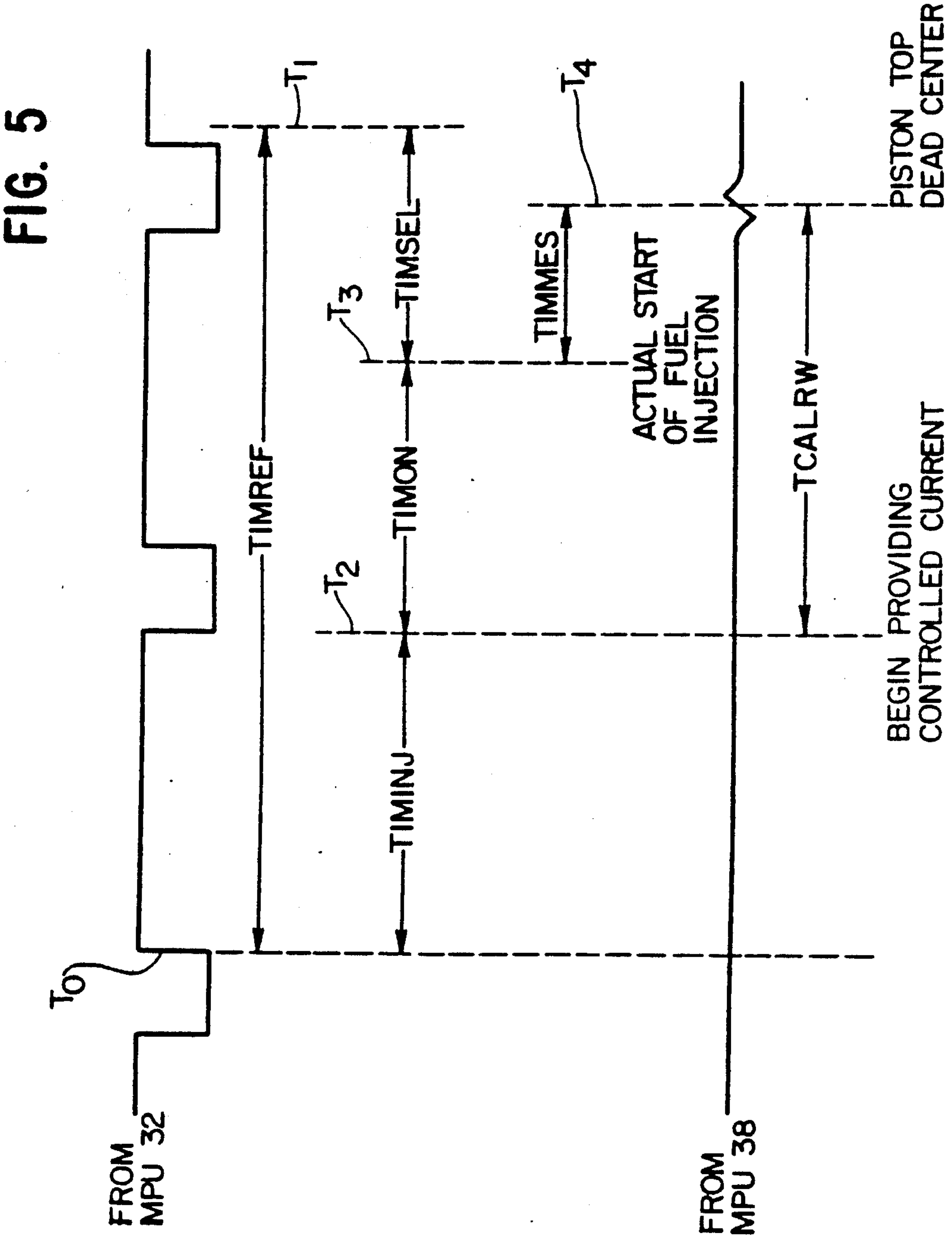
FIG. 5 is a pair of waveform diagrams illustrating the timing parameters involved in the method of the present invention.

As seen in the waveform diagram of FIG. 5, the effect of the foregoing calibration is to reduce or expand the time between time $T_0$ and $T_2$, designated TIMINJ, so that the time $T_I$ thereafter occurs at the time $T_4$. The value TIMINJ represents a delay period following a certain transition in the signal developed by the MPU 32, at the end of which the fuel injector is actuated. Adjustment of this value in turn assures that fuel injection timing is controlled precisely so that the proper quantity of fuel is delivered to each cylinder at the appropriate point in the stroke of the associated piston. The values TIMON and TIMSEL do not changes with changes in timing calibration, only the value TIMINJ.

The calibration method of the present invention is implemented using only the service tool 37 and the sensor 38. Inasmuch as these items are usable to calibrate a number of engines, accurate timing can be achieved without additional expense per engine.

I claim:

1. A method of calibrating the timing of a fuel injected engine having a piston disposed in a cylinder movable to a top dead center (TDC) position therein and a fuel injector which is actuable to inject fuel into the cylinder using the outputs of first and second position detectors which develop first and second signals both representing the position of the piston in the cylinder and a first reference timing value representing the time between a particular point of the first signal and an estimated time at which the piston is at the TDC position, comprising the steps of:

- operating the engine using the first reference timing value to identify the time at which the fuel injector is actuated;
- determining from the output of the second position detector a measured time value representing the length of time between actuation of the fuel injector and the time at which the piston reaches a certain position relative to the TDC position;
- subtracting from the measured time value an offset value representing the length of time between actuation of the fuel injector and the actual beginning of fuel injection to obtain an actual timing value;
- calculating a second reference timing value equal to the first reference timing value plus the actual timing value less a desired timing value; and
- subsequently using the second reference timing value and the output of the first position detector to ascertain the time at which the fuel injector is actuated.

2. The method of claim 1, wherein the step of determining includes the step of detecting the output of a sensor which develops a signal representing the time at which the piston reaches the TDC position.

3. The method of claim 1, wherein the step of subsequently using includes the step of calculating a delay period between the particular point of the first signal and the time at which the fuel injector is to be actuated.

4. The method of claim 1, wherein the fuel injector is of the solenoid actuated type and wherein the step of determining includes the steps of providing a controlled current to the fuel injector at the time the injector is actuated and measuring the period between the time at which the controlled current is first provided to the fuel injector and the time at which the piston reaches the TDC position.

5. The method of claim 1, wherein the step of using includes the step of storing the second reference value in a memory.

6. A method of calibrating the timing of a diesel engine having a piston disposed in a cylinder and a solenoid actuated fuel injector which is actuable to inject fuel into the cylinder using the output of a timing gear which develops a first signal representing the position of the piston in the cylinder and a position sensor which develops a second signal representing the time at which the piston is at a top dead center (TDC) position in the cylinder and a first reference timing value representing the time between a particular point of the first signal and an estimated time at which the piston reaches the TDC position, comprising the steps of:

- operating the engine using the first reference timing value to identify the time at which the fuel injector is actuated;
- determining from the output of the position sensor a measured time value representing the length of time between actuation of the fuel injector and the time at which the piston reaches a certain position relative to the TDC position;
- subtracting from the measured time value an offset value representing the length of time between actuation of the fuel injector and the actual beginning of fuel injection to obtain an actual timing value;
- calculating a second reference timing value equal to the first reference timing value plus the actual timing value less a desired timing value; and
- subsequently using the second reference timing value and the output of the timing gear to ascertain the time at which the fuel injector is actuated.

7. The method of claim 6, wherein the step of using includes the steps of detecting the occurrence of a certain transition of the first signal, determining from the second reference value the length of a delay period and actuating the fuel injector at the end of the delay period following the first signal certain transmission.

8. The method of claim 7, wherein the fuel injector is of the solenoid actuated type and wherein the step of determining includes the steps of providing a controlled current to the fuel injector at the time the injector is actuated and measuring the period between the time at which the controlled current is first provided to the fuel injector and the time at which the piston reaches the TDC position.

9. The method of claim 6, wherein the step of determining includes the step of detecting from the second signal when the piston reaches the TDC position.

* * * * *